Feb. 12, 1924.
E. G. GAYNOR
PIPE COLLAR PLATE
Filed April 11, 1923
1,483,428
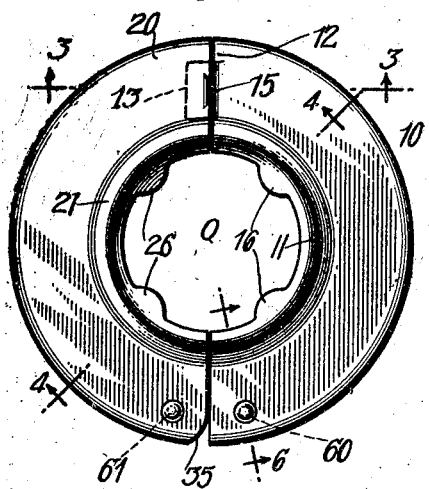
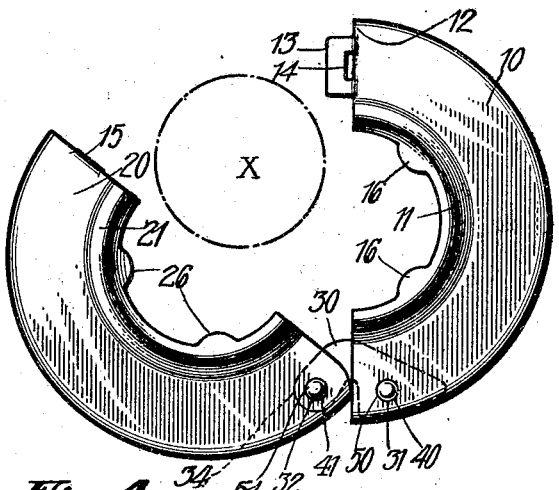
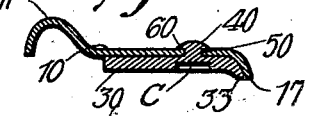
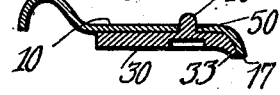
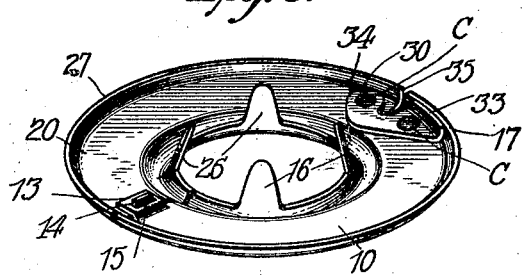
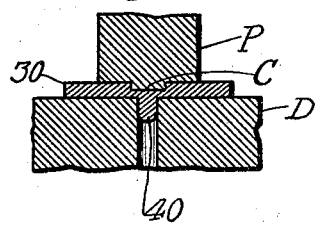
Inventor
Edwin G. Gaynor.
By his Attorney Patented Feb. 12, 1924.

1,483,428

UNITED STATES PATENT OFFICE.

EDWIN G. GAYNOR, OF STRATFORD, CONNECTICUT.

PIPE-COLLAR PLATE.

Application filed April 11, 1923. Serial No. 631,369.

*To all whom it may concern:*

Be it known that I, EDWIN G. GAYNOR, a citizen of the United States, and a resident of Stratford, county of Fairfield, State of Connecticut, have invented certain new and useful Improvements in Pipe-Collar Plates, of which the following is a specification.

The object of the invention is to so construct a split collar as to render it easy for ready fitting upon or around the pipe. The portions of the collar are readily separated so that the collar may be put over the pipe and then close snugly around the pipe to a neat fit.

In the drawing forming part of the specification:

Fig. 1 is a plan of a split collar embodying my invention shown in its closed position.

Fig. 2 is a plan view shown in the open position.

Fig. 3 is a section on line 3—3 of Fig. 1.

Fig. 4 is a section on line 4—4 of Fig. 1.

Fig. 5 is a view in perspective of the underside of the device, as shown in Fig. 1.

Fig. 6 is a section on line 6—6 of Fig. 1.

Fig. 7 is a similar view showing the projection 40 before being flanged over.

Fig. 8 is a section of a die and plunger showing the method of forming the pintle projections on the plate 30.

Referring to the drawings, the collar is made from a plurality of sections hinged together. In the preferred form shown each section is stamped out of a piece of sheet metal, one section 10 being semi-circular in shape and preferably provided with an inner bead portion 11, upon the inner edge of which are formed suitable prongs 16 which extend downwardly. From one edge 12 of the plate 10 extends a projecting portion 13 provided with a slot 14, which slot is designed to receive a downwardly bent tongue 15 at the edge of the adjacent semi-circular section 20. From the inner edge of the section 20 is a bead 21 which has the same shape as the bead 11 on the other section and which also is provided with downwardly projecting prongs 26 similar to the prongs on the other section 10.

The sectional plates 10 and 20 are hinged together, in a manner hereinafter to be described so that when separated to the maximum extent an opening X is formed which is greater than the diameter of the opening O when the split collar is closed so that the collar may be fitted over the pipe around which it is to be secured. It is necessary to pivotally secure the two parts 10 and 20 together by means of a joining plate 30, which plate 30 is pivoted to the plate 20 at the point 32 and is secured to the plate 10 at the point 31. The outer portion 33 of the plate 30 where it is joined to the plate 10 is extended for a substantial distance, the edge of which closely fits along the inner surface of the flange 17.

In order for the two plates to turn upon the pivot 32 it is necessary to cut the upper corner of the plate 20 at 35 on a curve which forms an arc of a circle which is drawn about the point 32 as a radius, and also to round off the end of the plate 30 which is pivoted to the section 20 upon the arc of a circle so that the end of the plate 30 which is placed against the inner surface of the flange 27 will turn freely.

The hinges are formed by pressing up projections or pintles 40 and 41 through suitable dies and then fitting the projections or pintles into suitably placed holes 50 and 51 in the plates 10 and 20, the ends of the projections being then turned over to form holding flanges which bear against the outer surface of the plates 10 and 20 respectively at the edge of the holes 50 and 51. The sectional plate 10 will not turn upon the projection 40 because the extended portion 33 of the plate 30 bears against the flange 17, but the plate 20 will turn on the projection 41 because of the existence of the arced edge 35 and the semi-circular end 34 of the connection plate, which end 34 does not bear against the flange 27.

The pintle projections 40 and 41 are formed in the following manner:

The plate 30 is placed over a die D. A plunger P, the surface of which has a greater surface area than the area of the cavity in the die D, is pressed down upon the plate 30, which results in forming a cavity C in the plate and the protrusion from the lower surface of the plate 30 of the metal into the cavity of the die D.

As above described, the projections 40 and 41 are placed respectively in the holes 50 and 51, and the ends of each of the projections are turned over to form engaging flanges 60 and 61, as shown in the drawing.

The collar is fitted to the pipe by opening the parts to a sufficient degree for the pipe to pass through the space X into the space O. Then the parts are closed and the tongue 15 is inserted into the slot 14 in the projecting portion 13, which portion is bent downwardly so as to project immediately under the plate 20 and extend in a plane parallel with the plane of the upper surfaces of the plates 10 and 20, thus making a close and neat fitting collar around the pipe. The projections or prongs 16 and 26 extend into the space between the floor and the pipe and frictionally engage the pipe by the elasticity of the metal so that the collar will thus be held securely in place.

As changes of construction could be made within the scope of my invention, it is intended that all matter contained in the above description or shown in the accompanying drawings shall be interpreted as illustrative and not in a limiting sense.

Having described the invention, what I claim and desire to secure by Letters Patent is:

1. A device of the type described which comprises, a pair of semi-circular plates and a connecting hinge plate having a pair of integral rivet members, one extending through an opening in one plate and the other through an opening in the other plate, said connecting plate having an extension at one end bearing against an outer flange of one plate and rounded at the opposite end to permit swinging of its plate about the rivet at this end as a pivot.

2. A device of the type described which comprises, a pair of semi-circular flanged plates each having an opening in their adjacent hinged ends, a hinge plate overlapping the adjacent ends of the plates and the respective openings, and a pair of projections stamped on said hinge plate fitted through said openings and headed to engage the edges of said openings, said hinge plate having an extension at one end bearing against the flange of one plate and a projection at the opposite end serving as a pintle for the other plate.

ED. G. GAYNOR.